US012777022B2

(12) United States Patent
Hamos et al.

(10) Patent No.: US 12,777,022 B2
(45) Date of Patent: Oct. 27, 2026

(54) UTILITY DATASET ANONYMIZATION

(71) Applicant: Itron, Inc., Liberty Lake, WA (US)

(72) Inventors: Gergely Hamos, Austin, TX (US); Vincent Paladini, Bee Cave, TX (US)

(73) Assignee: Itron, Inc., Liberty Lake, WA (US)

( * ) Notice: Subject to any disclaimer, the term of this patent is extended or adjusted under 35 U.S.C. 154(b) by 204 days.

(21) Appl. No.: 18/670,276

(22) Filed: May 21, 2024

(65) Prior Publication Data

US 2025/0365270 A1 Nov. 27, 2025

(51) Int. Cl.
*H04L 9/40* (2022.01)
*G06F 21/62* (2013.01)

(52) U.S. Cl.
CPC ...... *H04L 63/0421* (2013.01); *G06F 21/6254* (2013.01)

(58) Field of Classification Search
CPC .................................. G06F 21/62; H04L 9/40
See application file for complete search history.

(56) References Cited

U.S. PATENT DOCUMENTS 9,876,823 B2 * 1/2018 Smith ..................... H04L 9/088
11,387,998 B2 * 7/2022 Fleck ........................ H04L 9/14
2012/0239799 A1 * 9/2012 Wang .................... H04L 41/145 709/224
2012/0303616 A1 11/2012 Abuelsaad et al.
2021/0266297 A1 * 8/2021 Troitsky .............. H04L 63/0421
2022/0222373 A1 * 7/2022 Villax ................... G06F 21/602

OTHER PUBLICATIONS

Carvalho, et al., "Survey on Privacy-Preserving Techniques for Microdata Publication", ACM Computing Surveys, Mar. 28, 2023, pp. 1-40.
Search Report for European Application No. 25176272.0, Dated Jun. 16, 2025, 11 pages.

* cited by examiner

*Primary Examiner* — Andrew Suh
(74) *Attorney, Agent, or Firm* — Lee & Hayes, P.C.

(57) ABSTRACT

A data anonymization technique for datasets including personal identifiable information (PII) such as utility datasets may primarily include assigning anonymous identifiers to nodes in the dataset and swapping or otherwise moving portions of information between nodes of the dataset. The methodology of the swapping or moving operation may vary optionally based on a number of parameters, and may include swapping endpoints under a single parent, swapping endpoints between similar parents, and/or swapping similar endpoints between parents. The anonymization technique may output an anonymized dataset which reflects a topology of the original dataset and may optionally be updatable and modifiable to include additional data about existing or new nodes.

20 Claims, 7 Drawing Sheets

UTILITY DATASET ANONYMIZATION

BACKGROUND

In the course of providing utility services (e.g., electricity, water, gas, etc.) to consumers, utility companies track the consumers' consumption of the utility services in order to charge for providing the services. This consumption or usage data may be stored in one or more utility datasets. Often these utility datasets provide useful information to utility companies with respect to current or projected grid state information, for use in updating and/or maintaining equipment, trend analysis for demand prediction, internal development, and/or research purposes. Such utility datasets may include a topology structure including coordinates of endpoints (e.g., utility meters) associated with customer locations at which the services were provided, as well as connections between the endpoints and one or more parent nodes (e.g., transformers). The utility datasets also frequently include personal identifiable information (PII), such as customer names, addresses, contact information, and the like, which may be subject to obligations of privacy or confidentiality and may need to be removed. Conventional approaches for removing PII also strip useful information such as grid topology information, equipment specifications associated with individual endpoints, and the like.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
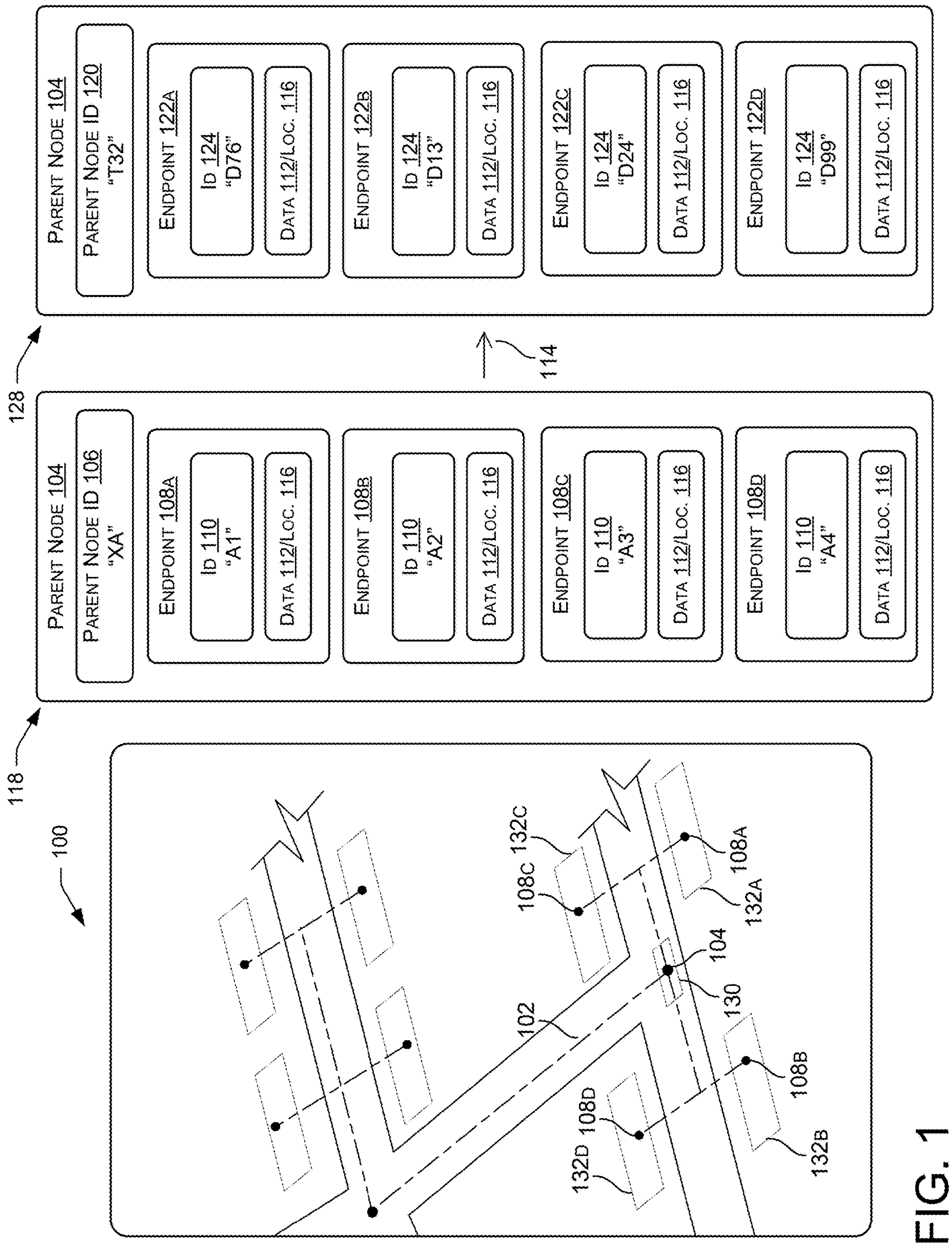
FIG. 1 is a schematic diagram illustrating a first operation of an exemplary anonymization technique, wherein utility data reflecting an environment has original identifiers replaced with anonymous identifiers, in accordance with examples from the disclosure.

As discussed above, utility datasets are highly useful for utility companies. Utility companies may be able to simulate grid stress, more clearly understand the state of a grid, develop algorithms for software relating to grids, plan grid maintenance and/or expansion activities, and numerous other beneficial uses. These datasets provide this value due to the presence of various features, such as reflections of grid topology, updatability, and ease of visualization. The presence of personal identifiable information (PII) in the utility dataset, which may be subject to privacy obligations, can present challenges to creating and applying these datasets with all desired features and while preserving the privacy obligations associated with the PII.

Techniques for anonymizing utility datasets are discussed herein. Such anonymization techniques maintain the desirable features of the utility dataset while removing PII. The anonymization technique may seek to preserve underlying topology of an original dataset including PII, may ensure that additional data can be incorporated into the anonymized dataset, may configure the anonymized dataset for output on a map for visualization purposes, etc. The dataset may include a topology, and in some examples the topology may mean that a number of nodes are considered a number of endpoints. In some instances, the technique may involve multiple operations. A first operation may involve assigning anonymous identifiers to various nodes in the dataset (e.g., assigning a new anonymous identifier to each house associated with a particular neighborhood's transformer). A second operation may involve mixing and matching a portion of information associated with each endpoint (e.g., swapping the consumption data and anonymous identifier associated with one service location with the consumption data and anonymous identifier associated with another service location, or swapping the location and parent node association of one service location with another service location). Specialized algorithms may be used to implement these techniques (e.g., a one-way hashing algorithm based on a secure key for the first operation, and a specific swapping approach based on features of the data for the second operation). Additional details of several example mixing and matching algorithms are described later.

Examples are provided for anonymizing a dataset in the context of an electricity grid. However, the techniques are not limited to use in connection with an electricity grid. Rather, the techniques describe herein may be applied to anonymizing other datasets while preserving features of information contained within the dataset. By way of example and not limitation, the techniques may be applied to datasets containing information about usage of any device or service (e.g., computing devices, telephones, vehicles, etc.) and including PII.

In the context of the utility industry, utility datasets as described herein may reflect utility data associated with an electricity grid or a portion of an electricity grid. The electricity grid may be supplied by electricity generated from a variety of sources, including but not limited to fossil fuels, solar power, wind power, nuclear power, geothermal power, hydroelectric power, tidal power, etc. The utility data may include service information. The service information may be consumption information that may reflect an aggregate sum of consumption over a period of time, a dollar (or other economic) amount of consumption, peak consumption, maximum load patterns, average consumption, median consumption, consumption level at a specific time point, consumption patterns, aberrant consumption behavior including outliers or spikes, a profile of what electricity supply source provides electricity, distance of electricity travel, cost of providing electricity, responsiveness to promotions or other commercial efforts, redundancy levels, maintenance demands, security information, company-assigned scores, as non-limiting examples. The utility data may additionally include information such as specific electrical equipment (e.g., model numbers, serial numbers, software or firmware versions, etc.), coordinates, etc.

The consumption information may reflect consumption at a number of endpoints. The endpoints may reflect individual customers, individual physical locations or sub-locations, aggregated non-customer users, aggregated customers or output interfaces, specific service points, etc. One customer or user may correspond to exactly one endpoint, or may correspond to multiple endpoints. Customers or users may draw electricity for residential, industrial, commercial, or other utility purposes. The endpoints of the utility dataset may be organized under one or more parent nodes. In some examples, the parent nodes correspond to transformers. In others, they may correspond to higher-order distribution stations or power plants. In some examples, there is only one layer of parent nodes. In others, there are multiple layers organized in a hierarchical structure. In some examples, parent nodes may also have connections to one another, or serve as endpoints.

PII may include, as non-limiting examples, customer numbers, customer names, customer usernames, customer passwords, customer payment information, customer history, associations between customers and endpoints, addresses, grid safety information, location, event history associated with the location, uniquely distinctive information, special accommodations, information privileged by law, company policy or commercial need, etc. PII may include information that cannot be removed simply by redacting labels associated with data points of a utility dataset. For example, skilled or unskilled individuals may be able to examine a dataset which has simply been freshly assigned new labels for each dataset. Sometimes, these individuals will have knowledge regarding particularly notable data such as knowing notable consumption data or predictions regarding data; or have access to other data either through illicit means such as trespass to examine electric meters, theft of mail, hacked accounts or databases, or through approved methods such as internal utility company access, memory as a serviceperson, emergency information, public information, or commercial access through sale. Given this knowledge, data access, or other conditions they may be able to identify names, addresses, or other features of PII. Hence, mere removal of labels may be insufficient to constitute removal of PII.

Generally, the data anonymization techniques begin with a collected utility dataset reflecting consumption data for a collection of nodes. The collection of nodes may include associations of individual nodes considered endpoints and parent nodes. The endpoints and parent nodes may have original identifiers. As non-limiting examples, the original identifiers may comprise PII, may comprise information which could be used to find PII in either public or private records, or may be proprietary identifiers. Non-limiting examples of original identifiers include customer account numbers, names, telephone numbers, specific codes, etc. Endpoints or nodes may have multiple original identifiers. Endpoints and nodes may also have a relationship comprising a topology. This topology may reflect physical electrical connection information representing how the various components (endpoints, nodes, etc.) from which the dataset was drawn are connected to one another. Alternatively, as non-limiting examples, the topology may reflect proposed connections, emergency situations, a simplified perspective, or commercial connections. In some examples, the topology may include further data beyond just the connections between the endpoints and parent nodes such as the type of connections used, specific coordinates in a multi-dimensional space, a geographic longitude or latitude associated with the endpoints or nodes, information about the date upon which the connection was made, the personnel that made the connection, or other features of the endpoints or nodes or connections. In some examples, some features of the topology data may be encoded or represented as colors, specific numeric or alphanumeric values, lists of connections, proximity thresholds, directed vectors, hierarchy classifications, semantic labels, probability distributions, similarity scores, etc. In some examples, the topology of a particular utility dataset may be determined by sequentially querying each node for a classification associated with that node and for information regarding any parents the node may have. The endpoints and parent nodes may also be organized into collections of endpoints or collections of parent nodes based at least in part on topology structure, real-world correspondence, or other configuration needs.

In some examples, certain levels of parent nodes may be abstracted or removed. In other examples, the dataset may be subdivided first for parallel or partial processing based on parameters including complexity, size, computational efficiency, security needs, privacy, etc. The divided dataset may continue to be presented as a divided dataset, or combined together.

The operations of the anonymization technique may be performed by computing devices. The computing devices may comprise a system including one or multiple components, some of which may be or may include non-transitory computer readable media which may cause processors to perform operations when executed. The components may, in other examples, be software, computational modules, specifically-developed computational algorithms, or trained machine-learned models. The components may, in other examples, be computing devices, processing units, or processors. The components may operate independently, in serial, or in parallel. In other examples, components and/or computing devices may be specifically printed chips optimized to perform the techniques disclosed herein, or logic circuits which perform the techniques herein based on instructions that may be encoded in software, hardware, or a combination of the two. The components and/or computing devices may be associated with access or authorization levels.

Generally, for the datasets used in the examples herein, the nodes may have four portions of information: (1) ID, (2) Topology, (3) Location, and (4) Service Information. By way of example: the ID may be, as described herein, an original or anonymous identifier; the topology information may, as described herein, indicate a parent node to which a node is associated; the location may, as described herein, indicate a latitude and longitude; and the service information may, as described herein, indicate consumption information. Some information, such as some PII, may be considered a fifth portion of information. In other examples, there may be no Location information or it may be considered part of the fifth portion of information instead.

Continuing with the example from above, the first operation may be considered encrypting the dataset to generate an encrypted dataset. This encryption may be a way of assigning or determining location information associated with nodes of the dataset. The first operation of the anonymizing technique may start with identifying and removing information associated with the endpoint or parent node that is not service or consumption information, is particularly identified forms of PII (e.g., username, contact information, passwords, addresses, etc.), or is otherwise not relevant or important. In some examples, this initial screening may reduce the dataset to only one original identifier associated with each endpoint or node, though the particular information that may be removed or retained in this operation may vary based on the characteristics of the node and the features of the dataset that are to be retained. Differential preservation of original identifiers may be based at least in part on missing information, the nature of a topology associated with the endpoints and parent nodes, specific planned use of the deanonymized dataset, a deanonymization policy, etc.

The first operation may also include assigning anonymous identifiers to the endpoints, the parent nodes, or both in order to generate an encrypted dataset. The anonymous identifiers may be formatted as integers, decimal point numbers, alphanumeric labels, colors, strings, etc. The format of the anonymous identifiers may match the format of the original identifiers, or be different from the original identifiers. The format of the anonymous identifiers associated with endpoints may be the same or differ from the format associated with parent nodes. The anonymous identifiers may be considered a form of coordinates or the location information involved in the encryption operation.

The anonymous identifiers may be assigned by a hashing algorithm. The hashing algorithm may be a one-way hashing algorithm and assign the anonymous identifiers in a fashion such that it would be computationally or logistically impractical to determine the original identifiers based on the anonymous identifiers without knowledge of the encryption function or key used to encrypt the dataset. Impracticality may be defined by law, a policy, or reasonable skill in the arts of computation and encryption. Impracticality may, in some examples, mean that the only or easiest method of determining original identifiers based on the anonymous identifiers is access to the list of original identifiers and the function by which the identifiers were assigned. The one-way hashing algorithm may further ensure that the anonymous identifiers are uniquely assigned. The one-way hashing algorithm may combine multiple original identifiers associated with an endpoint to one anonymous identifier (e.g., provide one anonymous identifier in place of both username and customer number), or assign every original identifier to its own anonymous identifier. The one-way hashing algorithm may ensure that two endpoints with the same original identifier retain the same anonymous identifier, or ensure that they receive different anonymous identifiers. The one-way hashing algorithm may ensure that the association between original identifier and endpoint or node is maintained. The topology information or other specific information such as the utility or consumption data associated with the endpoints may be maintained when assigning anonymous identifiers.

The one-way hashing algorithm may also allow for additional anonymous identifiers to be determined in the future when provided new inputs (e.g., when new endpoints or parent nodes are added to the grid). The one-way hashing algorithm may enable this since a second dataset, when processed by the same one-way hashing algorithm, may be combined with the encrypted version of the original dataset. This may involve assigning identical modifiers to new data associated with the endpoints or nodes of the original dataset, or may involve assigning new modifiers to that additional data. This may also involve assigning new modifiers to new data associated with endpoints or nodes not in the original dataset.

The one-way hashing algorithm may be a deterministic one-way hashing algorithm, which means that the one-way hashing algorithm will reliably produce the same anonymous identifier given the same inputs. Inputs to the one-way hashing algorithm may include, but are not limited to, the original identifier, a secret key, information associated with the endpoint or node such as geographic coordinates (latitude, longitude, or both), etc. The anonymization techniques may discard some information after the information is used as an input to the one-way hashing algorithm, or preserve the information for the potential addition of new data. For example, the anonymization technique may discard latitude and longitude data associated with nodes, or may preserve the latitude and longitude for future use as an input to the one-way hash algorithm when performing an update. The one-way hashing algorithm may be able to incorporate new data because of its deterministic nature. The secret key may be preserved in order to add further data, and may be kept highly secret in order to maintain security. The anonymous identifiers may be assigned by the one-way hash algorithm in a fashion that it is impractical to identify the original identifiers when given the anonymous identifiers even with access to the secret key. In some examples, the one-way hashing algorithm means that any intermediate mappings may be discarded.

In some embodiments, the one-way hashing algorithm is an implementation of a Sha256 one-way hash function which takes the original identifier as an input. The Sha256 one-way hash function may require at least a 128-bit random salt as an additional input in order to achieve security goals. In other embodiments, the Sha256 function may use multiple inputs in order to prevent pre-calculation attacks in the event that the assignment scheme of original identifiers is determined to be too predictable or for added security against pre-calculation attacks. By way of example and not limitation, the additional inputs may include the latitude and longitude of a particular endpoint or node.

Generally, by way of example, the first operation may be considered to have removed unnecessary data which is not part of the four main portions of information (ID, topology, location, and service information). Also, the first operation may be considered to have modified ID to reflect an anonymous identifier.

As discussed above, the anonymization techniques may include a second operation. The second operation may, in some examples, be considered to irreversibly modify location information associated with the endpoints. This second operation may include moving the association of data from one endpoint or node to another endpoint or node.

In some examples, the data moved may be underlying consumption data or other utility data, along with the associated anonymous identifier. This may be all of the consumption data associated with a particular endpoint or node, or only a portion. The data moved may also be the anonymous identifiers associated with the endpoints. This may be considered moving the ID portion and the Service Information portion.

In other examples, the data moved may be the association of parent node and coordinates associated with a node. This may be considered moving the Topology and Location portions of the information. In some examples, the Location portion was removed in the first operation, and only the association of parent node (the Topology portion) may be swapped.

Generally, by way of example, the movement of data may move ID and Service Information portions together, and move Topology and Location information together.

While described here as moving the service information and ID associated with individual endpoints or nodes, another way of describing this concept is to say that labels (e.g., parent node and coordinate) associated with individual data entries are exchanged with labels of other individual data entries. Some descriptions of exemplary datasets may consider the location and topology as the node, and so performing a swap may be considered swapping the node. Other descriptions may consider the data and the anonymous identifier as the node, and so performing a swap may be considered swapping the node.

One exemplary way of understanding a movement of data may be that a physical description of location and parent node connectivity remains constant to reflect reality, but the previously assigned ID label (anonymous identifier) and data entries reflecting consumption information have been moved to different topology and coordinate positions.

The operation may move data (portions of information) from one endpoint or node to another endpoint or node according to different methodologies. The methodology may be selected based on a variety of factors. The methodology may be selected based on a geographic location associated with the utility dataset. The methodology may be selected based on a determination of demographic data associated with the utility dataset. The methodology may be selected by a user input, company policy, or be based on the intended use of the anonymized dataset or a computational efficiency. The methodology may also be selected based at least in part on features of the dataset. Features may include measurements of a collection of nodes of the dataset. Examples of such features include estimations of the number of endpoints assigned to parent nodes (through actual count, mean, median, mode, or other measurements demonstrating complexity of the topology). The methodology may be selected based on a system of thresholds associated with the measurements. The thresholds may or may not be pre-assigned, and may correspond to sufficient anonymization needs, geographic information, demographic information, intended uses, user input, alterations for testing, predictions, assumptions, etc. For example, the threshold may be a measurement that there are over a threshold number (e.g., eight, ten, fifteen, etc.) of endpoints assigned to each parent node. The threshold may be determined or set based at least in part on the laws, rules, and/or utility grid structures of a particular geographical location. The sufficient anonymization need may indicate that for datasets where there are under the threshold number of endpoints per parent node, a certain methodology is the appropriate methodology to be used.

In some examples, multiple methodologies may be used to move, or swap information. The second operation may apply the multiple methodologies to the entire dataset in order, may apply various methodologies to various portions of the dataset, or may include an evaluation and determination not to use a methodology made available in certain circumstances. In some examples, there may be a mandatory methodology and one or multiple optional methodologies. The selection of methodology and/or application of the methodology may be performed by a user, by one or more specifically-developed computational algorithms, by one or more trained machine-learned models, or any combination thereof.

In some examples, the second operation may comprise a "mix-and-match" methodology. The mix-and-match methodology may identify utility data associated with all of the endpoints organized under a particular parent node. By way of example, this may reflect the utility data associated with all houses under a particular transformer. One exemplary first mix-and-match methodology may swap the anonymous identifier and consumption information from each of the endpoints to another endpoint. This may be known as "service point mix-and-match." This may mean that the parent node topology and geographical coordinates of utility data associated with the anonymously identified parent node is maintained, but the identifier labels and endpoint consumption data have been shifted. This may mean that the initial anonymous identifier associated with a first individual endpoint has been changed to a swapped anonymous identifier, wherein the swapped anonymous identifier is the initial anonymous identifier associated with another individual endpoint associated with the same parent node as the first individual endpoint. Along with the swap of anonymous identifier, the consumption data associated with each anonymous identifier will be relocated so that the pairs of anonymous identifier and consumption data will remain associated. In some examples, all such individual endpoints will have their anonymous identifiers and consumption data changed to other anonymous identifiers and consumption data. This may be a one-to-one swap, in some examples. In others, it may not be one-to-one and one anonymous identifier may be changed to the same anonymous identifier and consumption data as another endpoint. This may mean that an individual attempting to determine PII would incorrectly match identifier and data to location and topology, thereby anonymizing the dataset. In some examples, all endpoints have their anonymous identifiers swapped. In other examples, only some endpoints have their anonymous identifiers swapped in order to establish additional security because it takes additional computational resources to determine PII if one cannot be certain that all endpoints are actually different.

The second operation may alternatively comprise a second mix-and-match methodology. This second mix-and-match methodology may be performed subsequent to performing the service point mix-and-match methodology. In some examples, such as grids in the United States with fewer than fifteen endpoints per parent node, the service point mix-and-match may not achieve anonymization needs. In those cases, portions of information (such as anonymous identifiers and consumption data) associated with some or all of the endpoints under one parent node will be swapped with anonymous identifiers and consumption data associated with some or all of the endpoints under a second parent node. This methodology may be known as "transformer mix-and-match." This methodology may involve determinations regarding the parent nodes. In some examples, the swap may only be made if certain parameters are met, such as similar aggregated consumption data, similar underlying distributions of usage of associated endpoints, demographic information, or identical service point count. Of these, service point count may be considered mandatory and the other features may be considered optional parameters. For example, if two transformers representing a first parent node and a different second parent node are determined to have identical service point count, the transformer mix-and-match methodology may implement a swap of anonymous identifier and consumption data pairs between all endpoints of one parent node and endpoints of the other parent node. This determination of identical service point count may be considered a determination of similarity or substantially similar data, but other examples of similarity may be implemented. The assignment of anonymous identifier and consumption data pairing to other endpoints in this swap may be random but ensure distinct replacement (e.g., prevent two endpoints from assigning to the same endpoint on the second parent node, while leaving one endpoint on the second parent node without an identifier), or attempt to determine corresponding endpoints to maintain certain topological features. In some examples, a direct correspondence between endpoints of one parent node and a second parent node may be established. In other examples, a collection of anonymous identifiers may be identified based on a collection of anonymous identifiers associated with a parent node, and the entire collection may be swapped with a collection corresponding to another parent node, before reassignment of portions of information to the endpoints without establishing a correspondence between endpoints. In some examples, the swapping may occur over three, four, or more parent nodes rather than directly between two. In some examples, parent nodes may have their identifiers swapped, and in other examples parent nodes may retain their anonymous identifiers. In some examples, only a subset of endpoints are swapped in order to increase security and difficulty of reverse-engineering the algorithm, in other examples all endpoints are swapped to satisfy topology fidelity goals. In some examples, only the endpoint identifiers are swapped, in other examples endpoints and parent nodes may be swapped.

The second operation may also comprise a third mix-and-match methodology. This methodology may be known as "unchanged customer swap." This methodology may be applicable when there are endpoints with no direct parent nodes, or parent nodes have very few endpoints, such as one or two. This may reflect portions of utility datasets associated with rural areas. This methodology may comprise having a first endpoint whose data needs to be swapped, identifying a particular endpoint associated with a separate different parent node having different character, identifying a similarity or substantially similar data (such as similarity of character of consumption data) between the first endpoint and the similar endpoint, and swapping a portion of information (e.g., swapping anonymous identifiers and consumption data). Similarity may be usage pattern or total consumption similarity in some examples, other similarities may be similar to those discussed previously with respect to parent node similarity or analysis of associated parameters or underlying data. The methodology may further comprise, in the event that a similar endpoint cannot be found, swapping the first endpoint with a second endpoint based on geographical proximity, random choice, or some other approach. This swap may be based on a determination of a minimal level of data deficit. The unchanged customer swap may be performed after the service point mix-and-match and the transformer mix-and-match, or after the service point mix-and-match but before the transformer mix-and-match.

In some examples, the second operation is only performed once. In other examples, the second operation is performed multiple times. In some examples, intermediate mappings may be discarded. In some examples, parent nodes may also be considered endpoints and their IDs may also be swapped according to the second operation. In other examples, only nodes without dependent nodes may be considered endpoints.

In some examples, the first operation occurs before the second operation. In other examples, the second operation occurs first. In other examples, the two operations occur in parallel and then the result of the two operations is combined.

After the first and second operations are performed, the techniques generate an output dataset (processed dataset) which will have utility consumption information, topology, and potentially additional utility data such as equipment information, geographic coordinates, etc. The topology and map layout will be maintained from the original, but the PII will have been removed. Service point data may be assigned to a location close to its origin, but the specific origin cannot be practically determined by an entity with access only to the output dataset. Thus, the real consumption data will also be detached from the original consumption location. Because the topology information is maintained, along with potential additional information such as coordinates, equipment, map data, etc., the output dataset may be visualized in some examples on a map.

In some examples, the first and second operations enable the updating of the output dataset. In some examples, a second utility dataset may be received. In some examples, only one second dataset may be received, or second datasets may be provided in serial fashion. In other examples, multiple additional datasets may be received at once for updating and/or synthesis. The dataset may reflect potential test conditions, may reflect simulated weather conditions, may reflect changes in the environment thanks to new construction, may simply include information newly collected due to time, may include newly purchased information, etc. The second dataset may comprise new data regarding parent nodes or endpoints included in the first dataset, data regarding new endpoints and parent nodes, data with no nodes of the first dataset, or a combination thereof. Because of the first operation, the original first dataset is not needed to update the anonymized dataset. The first operation may be identically or similarly applied to the second dataset to create a second encrypted dataset. This resulting second encrypted dataset may be joined to the output dataset based on the contained information and the anonymous identifiers. Then, the second operation of swapping may be applied to output an updated output dataset that has had its PII removed. In some examples, this updating can be performed any number of times.

In some examples, the combining of the first and second dataset occurs before the first and second operations occur. In other examples, the second dataset may undergo the first operation and then combination may occur, followed by the second operation. In other examples, the second dataset may undergo the second operation, then combination may occur, then the first operation may occur. In other examples, the second dataset may undergo the first and second operations after combining with the first dataset. In some examples, the second operation may be repeated on the combined dataset even after it has been independently performed on the second dataset.

The output dataset, along with any visualizations, may be used in some examples for training models to identify features. In other examples, the output dataset may be used to allow humans to visualize data. The output dataset may also be used to test software relating to grid control, predict the effects of events (such as weather or outages) or trends (such as increased solar production) on a grid, or used when planning grids. Additionally, the grid data may be sold for commercial use by other companies without providing commercially disadvantageous information. The output dataset may also be generated and used in order to maintain compliance with internal or legal requirements.

The techniques enclosed herein provide multiple technical and practical benefits. The techniques can be used to improve a functioning of a computer device in a number of ways. For example, in the context of anonymizing and processing utility data and its topology, the one-way hashing algorithm is highly efficient at encrypting the dataset in a fashion that is impractical for either a computer or a human to decode. Additionally, the mix-and-match methodologies utilize operations which are domain-specific to utility topologies. This means that intermediate mappings may be discarded, increasing the capacity of a computer to perform the anonymization with speed and accuracy. The process may also be performed with increased efficiency because of discriminating application of the second operation in order to reduce unnecessary computational steps when only certain forms of swapping methodology are appropriate. This speed may result in meaningful gains to a user or company both in the form of less computing costs and in the form of higher research and development testing throughput as datasets can be processed in higher volumes. The similarity analyses in the second operation also improve the quality of the output dataset. Furthermore, the techniques enclosed herein also provide significant advantages in the maintenance of underlying topology as well as updatability of the output dataset. These features also may not be easily understood or evaluated by humans or users, and the techniques herein both help in presenting those features as well as removing PII in a manner tuned to those features. Users and companies may also find additional use in the security advantages provided by the techniques herein. Computer-implemented embodiments of the techniques herein may allow greater limitation of access from unauthorized and/or illicit internal users, as user contact with the PII is not necessary for anonymization. Enabling unauthorized or limited authority internal users to implement the techniques herein because of this access control may be another advantage; companies may be able to delegate the task of creating these datasets with greater flexibility. The techniques herein also provide practical improvements because anonymized utility datasets representing real data are more accurate and realistic than artificially generated datasets. This may mean that anonymized utility datasets are better suited for useful purposes such as, but not limited to, research and development efforts. Removal of PII also has benefits for creating robust datasets, because anonymization removes the risk of human bias that may be introduced based on the existence of PII when interpreting or analyzing datasets.

The techniques described herein can be implemented in a number of ways. Example implementations are provided below with reference to the following figures. Although discussed in the context of a specific electric grid, the systems, methods, and apparatuses described herein can be applied to a variety of systems (e.g., water grids, internet grids, gas grids, fiber-optic networks, cellular networks, financial dependency networks, non-utility data comprising PII wherein topology should be maintained), and is not limited to electric grids. In another example, the techniques can be utilized on a water utility grid. Additionally, the techniques described herein can be used with real data, simulated data, or any combination of the two.

FIG. 1 is a schematic view of the first operation of an exemplary anonymization technique. In the illustrated example, environment 100 has an electrical grid 102. The electrical grid 102 includes a transformer 130 and service points 132*a*-132*d*. This can be represented as utility dataset 118, comprising a parent node 104 (which corresponds to transformer 130), and endpoints 108*a*-108*d* (which correspond to the service points 132*a*-132*d*). Only one parent node and only four associated endpoints are shown for simplicity in this example. The parent node has a parent node ID 106, which is an example of an original identifier associated with a parent node. The endpoints have endpoint IDs 110, which are examples of original identifiers associated with the endpoints. IDs 106 and 110 may be labels. The endpoints also have data 112, which may include consumption data, geographical coordinates, or other data. Data 112 may include or be in addition to location information 116. This data may have been pre-processed to remove some PII or format the dataset 118 for encryption 114. Encryption 114 then occurs, which may comprise a one-way hash algorithm. The resulting encrypted dataset 128 is generated by the encryption 114. In this example, the ID of the parent node has been changed to updated ID 120, and the endpoints have been changed to updated endpoints 122*a*-122*d*. In this example, updated endpoints 122*a*-122*d* have only had their ID labels changed to updated IDs 124, while data 112 remains the same. For example, parent label "XA" has been changed to "T32," while endpoint label "A1" has been changed to "D76." In other examples, data 112 may also be updated or changed to remove some forms of PII. Data 112 may, in some examples, include service information/consumption information, location or coordinate information, and topology or parent information.

Figure 2A:
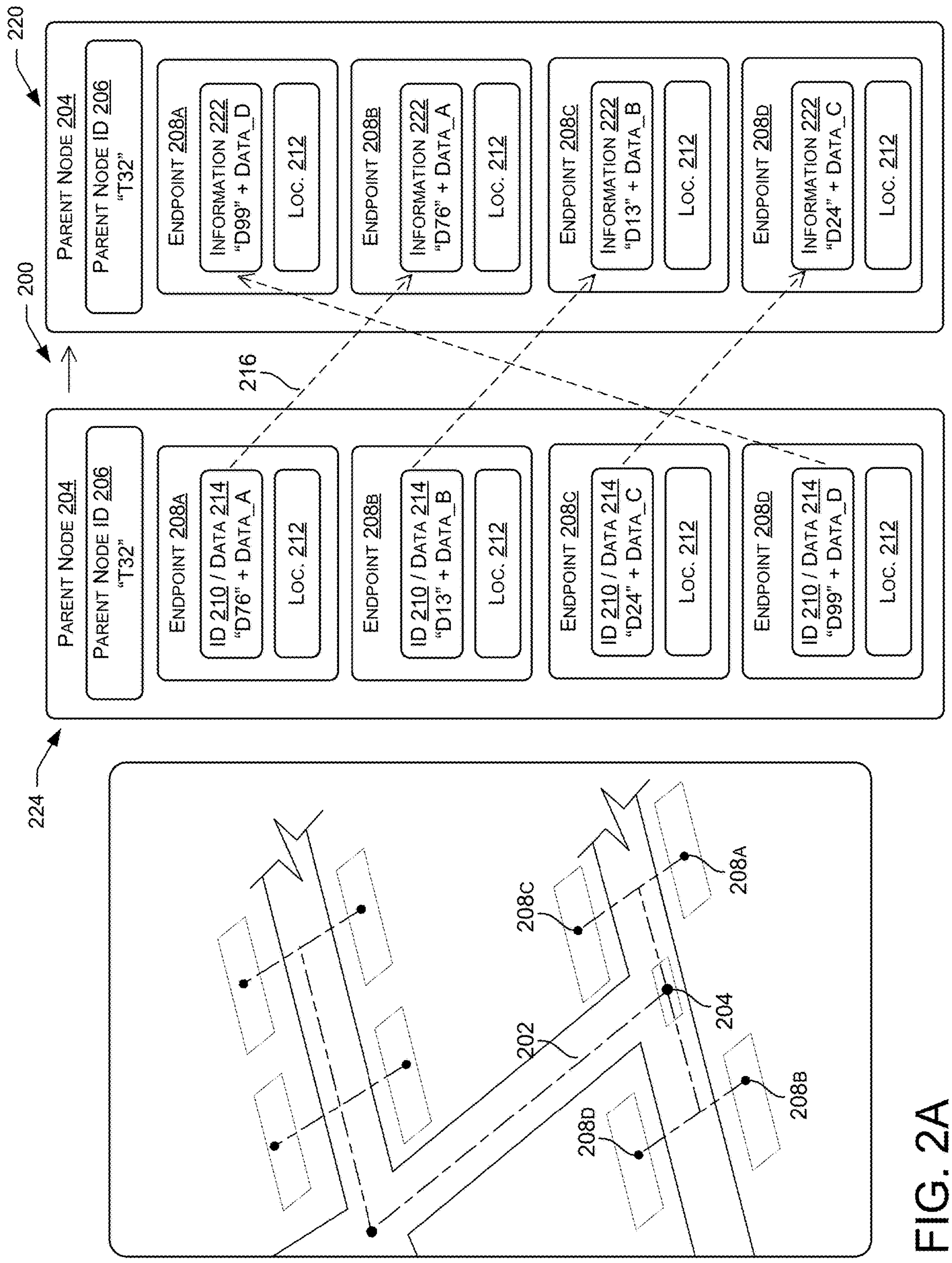
FIG. 2A is a schematic diagram illustrating an exemplary methodology of a second operation of an exemplary anonymization technique, including swapping a portion of information associated with endpoints under one parent node, in accordance with examples from the disclosure.

FIG. 2A represents an example of a "service point mix-and-match" methodology 200 used for an exemplary implementation of the previously discussed second operation. Similarly, only one parent node 204 has been illustrated for convenience. Dataset 224 has, in this example, already undergone the first operation of anonymous identifier assignment by one-way hash as shown in FIG. 1. Dataset 224, similar to the dataset of FIG. 1, comprises a parent node 204 reflecting an actual topology, a parent node label 206, and endpoints 208*a*-208*d* with IDs 210, data 214 and location information 212. Location information 212 may, by way of example, include coordinate information and store parent node ID label 206 as topology information. While in this figure there are only four endpoints 208*a*-208*d*, this is for ease of illustration and actual examples may include any greater or lesser number of endpoints. The IDs 210 and data 214 of the endpoints 208 are assigned to different endpoints 208, and moved according to a swap 216. In this example, the swap 216 is simply directly to the next adjacent endpoint 208, with a wrap back to the first endpoint 208*a* for the last endpoint 208*d*. Hence "D76" is moved to the endpoint 208*b* previously labelled "D13," and "D99" is the new label for the endpoint 208*a* previously labelled "D76." Similarly, Data A moves along with "D76" to be associated with endpoint 208*b*. This results in updated (swapped) information 222. However, this swap can be more complex, random, or specifically tuned to match based on data 214, separate parameters, specific policies, or security needs. The result is an anonymized dataset 220.

Figure 2B:
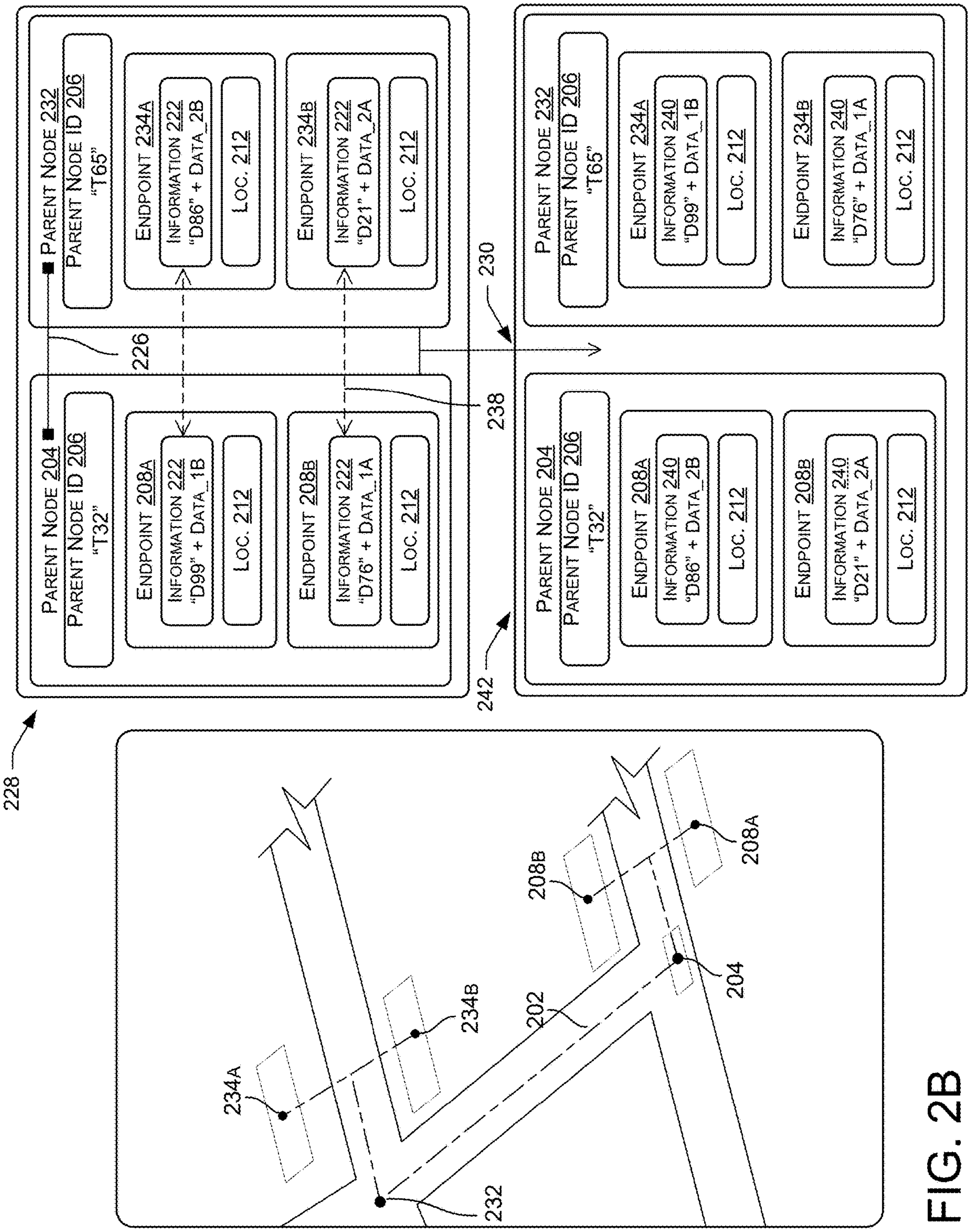
FIG. 2B is a schematic diagram illustrating an exemplary methodology of a second operation of an exemplary anonymization technique, including swapping a portion of information associated with endpoints under one parent node with a portion of information associated with endpoints under a second, similar parent node, in accordance with examples from the disclosure.

FIG. 2B represents an example of a "transformer mix-and-match" methodology 230. In this example, dataset 228, which has undergone a first phase of anonymization as per FIG. 2A, includes parent node 204 and parent node 232. Both similarly have labels 206. Endpoints 208*a*-208*b* are sorted under node 204, while endpoints 234*a*-234*b* are sorted under node 232. While in this figure there are only four endpoints 208*a*-208*b* and 234*a*-234*b*, this is for case of illustration and actual examples may include any greater or lesser number of endpoints. Both groups of endpoints have labels 222 that were assigned by an approach similar to that of FIG. 1. Additionally, in this example labels 222 have already been swapped according to the methodology of FIG. 2A. However, because there are so few endpoints 208 and 234 under parent nodes 204 and 232 respectively, it may be that the dataset 228 is insufficiently anonymized. Hence, based on a similarity 226 between parent node 204 and parent node 232, a swap 238 is determined. In this example, the similarity 226 is that both parent nodes 204 and 232 have the same number (two) of endpoint nodes 208 and 234. The result is anonymized dataset 242, where updated informations 222 have become updated informations 240 based on swapping information 222 between corresponding endpoints 208 and 234. This swap 238 may simply be a direct order-based swap as shown here for convenience, swap 238 may be random, or swap 238 may be based on location data 212 or other parameters. In this example, parent node labels 206 are not swapped.

Figure 2C:
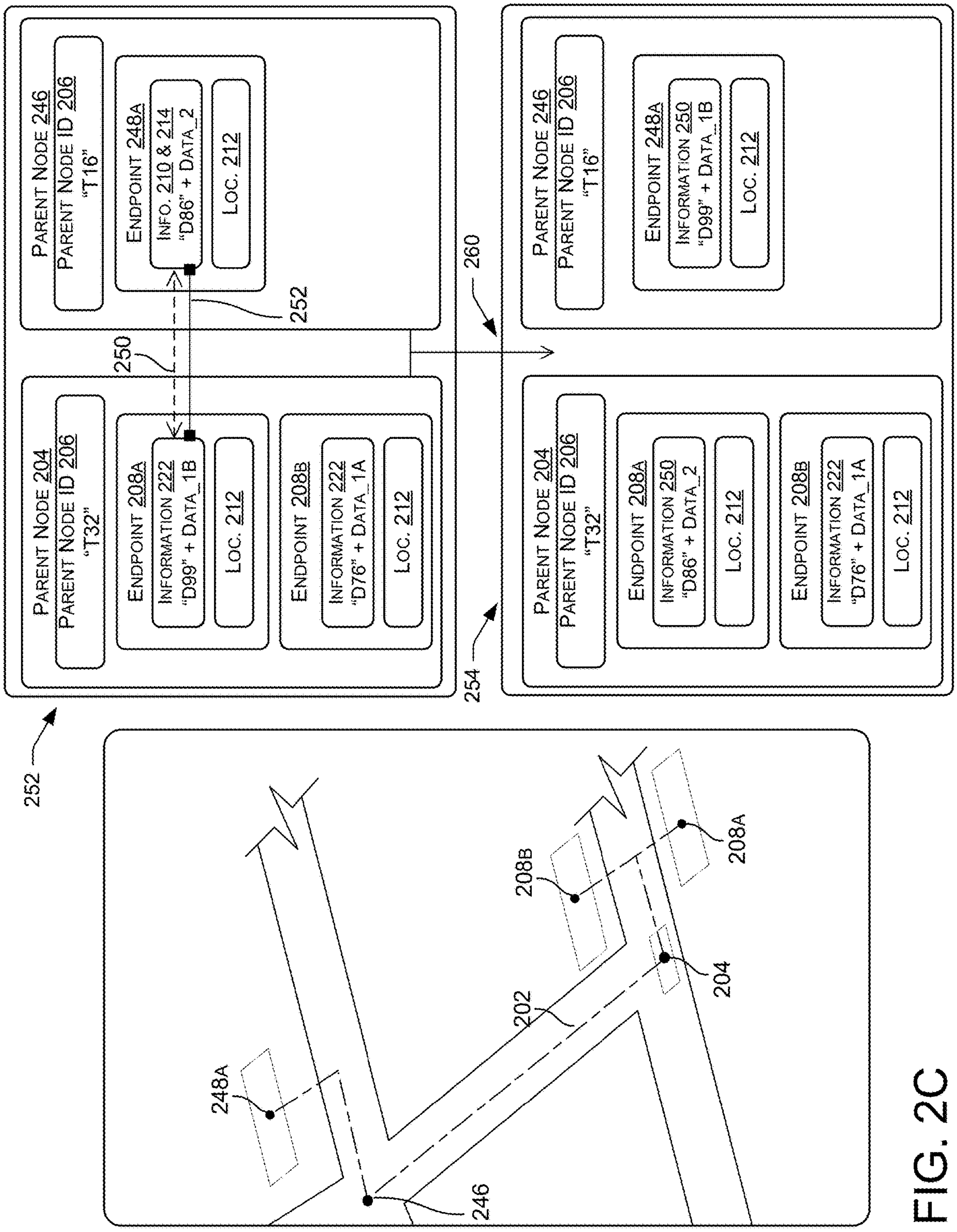
FIG. 2C is a schematic diagram illustrating an exemplary methodology of a second operation of an exemplary anonymization technique, including swapping a portion of information associated with an endpoint under one parent node with a portion of information associated with a second, similar endpoint under a second parent node, in accordance with examples from the disclosure.

FIG. 2C illustrates an example of an "unchanged customer swap" methodology 260. Dataset 252 may have only been processed according to an approach similar to that shown in FIG. 1 and FIG. 2A, or dataset 252 may have been processed according to an approach similar to that shown in FIG. 1, FIG. 2A, and FIG. 2B. In this case, labels 222 have only been swapped similar to FIG. 2A. Dataset 252 may include parent node 204 with endpoints 208*a*-*b* and a parent node 246 with only one (or other very small number) endpoint 248*a*. While in this figure there are only three endpoints 208*a*-208*b* and 248*a*, this is for ease of illustration and actual examples may include any greater or lesser number of endpoints. As a result, endpoint 248*a* retains its information (originally encrypted label 210 and data 214) in this case even after being processed as per the illustration of FIG. 2A. In some examples, endpoint 248*a* may have an updated information 222, but because of a very small number of endpoints 248*a*, and no similarity 226, endpoint 248*a* may still be considered to contain PII. This may reflect grid 202 being a rural electric grid. In that case, based on a similarity 252, a swap 250 is performed. The result is that in anonymized dataset 254, endpoints 208 have swapped information 250 and previous information 222, while endpoint 248 has updated information 250.

Figure 3:
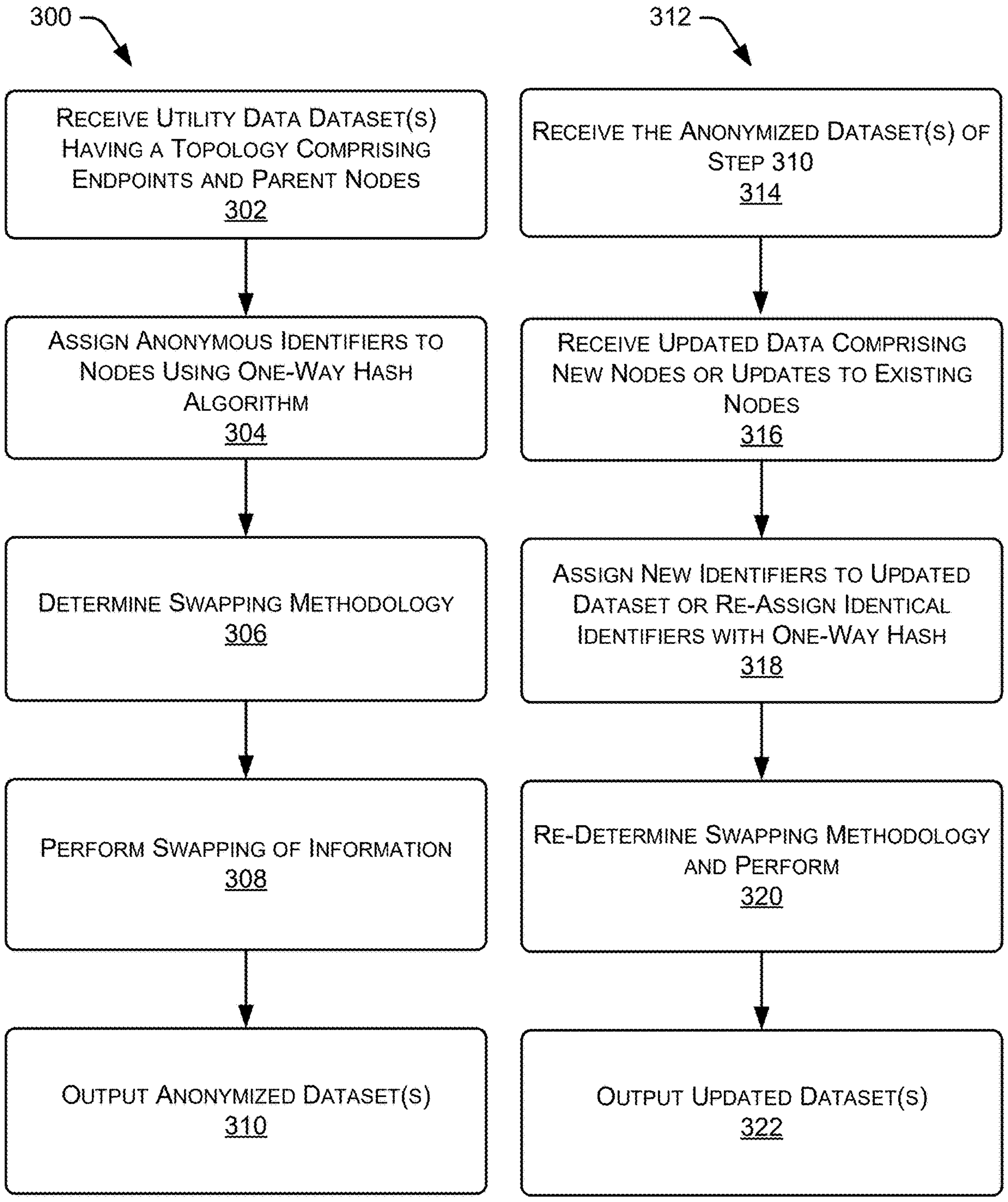
FIG. 3 is a flow diagram of an exemplary process by which a utility dataset may have its nodes assigned anonymous identifiers, have a portion of their information swapped, be outputted, and optionally be updated, in accordance with examples from the disclosure.

FIG. 3 illustrates a flowchart depicting an example process 300 and optional additional example process 312. For example, some or all of the processes 300 and 312 can be performed by one or more components in FIG. 4, as described herein. For example, some or all of the processes 300 and 312 can be performed by the computing device(s) 408. At operation 302, the process 300 may include receiving a utility dataset with endpoints and parent nodes. This utility dataset may already have been partially processed to be prepared for the process 300. In some examples, this is received over an internet or intranet network. In others, the dataset is manually input or provided directly to the process via stored memory. In some examples, the topology may be pre-determined, in other examples the topology is determined at operation 302. In some examples, operation 302 may dynamically or simultaneously receive additional datasets or information, for example as part of a pipeline.

At operation 304, anonymous identifiers are assigned to nodes using a one-way hash algorithm. In some examples, the original identifiers are also removed. In some examples, further information may also be removed at operation 304. In some examples, only endpoints are assigned identifiers, in other examples parent nodes and endpoints are assigned identifiers. In some examples, the one-way hash algorithm may rely on a secret key. In other examples, the one-way hash algorithm may also rely on information associated with the endpoints, such as a longitude and/or latitude. In some examples, the assignment of anonymous identifiers is deterministic. In some examples, operation 304 may dynamically adapt to additional datasets or information.

At operation 306, an appropriate swapping methodology may be selected. This may include starting with a service point mix-and-match approach. In some examples, further swapping may be needed. This may be determined based on information associated with the topology, specific parameters (e.g., user input, company policy, intended use of the anonymized dataset, computational efficiency, anonymization needs, geographic information, demographic information, intended dataset uses, alterations for testing, predictions, assumptions, commercial value), or underlying data information associated with endpoint/parent node data (e.g., geographic information, demographic information, consumption data, equipment information) included in the dataset. This information may include examining features of the dataset and the endpoints and/or determining similarities between endpoints and/or parent nodes. This operation 306 may also include pre-defined and/or dynamic thresholds by which the topology information, parameters, underlying data information, and/or determined similarities may be used to determine appropriate swapping methodologies. This may be performed probabilistically or deterministically, and may be performed by a trained machine-learned model or algorithmic computer program. Further swapping may include a transformer mix-and-match methodology or an unchanged customer mix-and-match methodology. This operation 306 may include predictions regarding the swapping, an evaluation of the dataset after operation 308 to check for further swapping needs, and/or a determined sequence of swapping to be executed. Operation 306 may perform some of its determinations as part of an evaluation of the dataset only after at least one execution of operation 308 to increase computational efficiency. For example, operation 306 may evaluate the dataset after operation 308 performs a service point mix-and-match to check for unchanged nodes that would merit an unchanged customer mix-and-match. Operation 306 may also subdivide the dataset or perform other forms of processing to prepare the dataset for operation 308. Operation 306 may determine that only one or multiple portions of the dataset need to be swapped. In some examples, operation 306 may determine that no swapping is necessary for part or all of the dataset encrypted by operation 304. In some examples, operation 308 may dynamically adapt to additional datasets or information.

Operation 308 may include a swapping of only information between endpoints. Operation 308 may alternatively include swapping information between endpoints and parent nodes. The swapping of endpoints may be different from the swapping of parent nodes. By way of example, endpoints associated with a first parent node may have their identifiers swapped with endpoints associated with a second parent node. However, the identifier of the first parent node may have its identifier swapped with the identifier of a third parent node. Operation 308 may include one or more of the service point mix-and-match, transformer mix-and-match, or unchanged customer mix-and-match methodologies. Operation 308 may apply these methodologies differentially based on determinations performed in operation 306. Operation 308 may implement the methodology by parallel processing or subdividing the dataset. Operation 306 may only partially perform the swapping before reevaluation by operation 306, or may entirely perform the swapping.

Operation 306 may dynamically accommodate additional information, datasets, or instructions.

Operation 310 may include outputting an anonymized dataset based at least in part on the results of operations 308 and 310. Operation 310 may include a verification that the dataset meets certain parameters or needs. Operation 310 may also include combining any subdivisions, formatting metadata, or removing artifacts of previous processing, either before operation 302 or during operations 302-310. Operation 310 may verify that the outputted dataset is appropriately configured for certain needs, and/or configure the dataset to meet those needs. In some examples, those needs are visualizing and mapping. In other examples, operation 310 may prepare the dataset for storage in memory, storage on the cloud, input to another process, and/or commercial sale. In yet further examples, operation 310 may analyze the dataset to provide testing and development information. This information may be provided to a machine-learning model as input or training, may be provided to a human for inspection, or further analyzed as a metric or metadata. In some examples, only one dataset is output, either as a combined dataset or because only one was input. In other examples, multiple datasets may be output, due to subdivision or due to an input of multiple datasets.

Optional process 312 may occur after process 300, in parallel with process 300, or during operations 306, 308, or 310. By way of example but without limitation, the process 312 may occur after process 300 has entirely completed. Process 312 may be an update due to new data, a reprocessing with different parameters, or a planned combination of datasets.

At operation 314, the anonymized dataset output by operation 310 or a separate example of process 300 is received. Features of operation 314 may be similar to those of operation 302, but there may be some differences including evaluation of previous processing history, examination of metadata, acceptable inputs, etc. In some examples, the dataset output by operation 310 may have been further modified.

Operation 316 may include features similar to operations 302 and/or 314. Operation 316, in some examples, may include analyzing the second dataset for features similar to those analyzed in process 300. The second dataset may be only one dataset, or may be a second, third, fourth dataset, etc. In other examples, the features may be different. This difference may be selected by a user for testing purposes, for simulation purposes, for research purposes, for computational efficiency purposes, or other purposes. In some examples, operation 316 includes a determination that the second dataset includes updates to existing nodes from the first dataset received in operation 314. In other examples, the operation 316 may include a determination that there is complete difference in nodes, and/or overlap in nodes. In some examples, operation 316 includes combining the first and second datasets by way of concatenation, replacement based on parameters such as date, or some other method of combination. In other examples, the datasets are kept separate or subdivided. In some examples, the nodes may be "tagged" in operation 316 to identify which dataset they belonged to.

Operation 318 may include features similar to those of operation 304, and may also include some differences. In some examples, operation 318 uses an identical secret key and/or combination of secret keys and parameters to operation 304. In some examples, entirely new identifiers may be assigned despite previous swaps. In other examples, operation 318 may determine which identifiers have already been encrypted and only assign to nodes having original identifiers. In some examples, a combination and/or separation of the datasets may be performed here.

Operation 320 may include features similar to those of operations 306 and 308, and also may include some differences. In some examples, operation 320 performs identically to operation 308. In other examples, the implementation of operation 320 may involve changing parameters, methodologies, or features. This may be based on features of the data, in order to facilitate the update process, or to increase computational efficiency because of tuning that leverages knowledge of operations 306 and 308. In yet other examples, the determination may be made "fresh," without access to information regarding determinations made at operations 306 and 308. Operation 320 may discriminate between data from the first or second dataset for the purpose of swaps, or may allow swaps between datasets. Operation 320 may also perform a combination and/or separation of the datasets.

Operation 322 may include features similar to operation 310, and also may include some differences. Operation 322 may also perform a combination and/or separation of the datasets.

Figure 4:
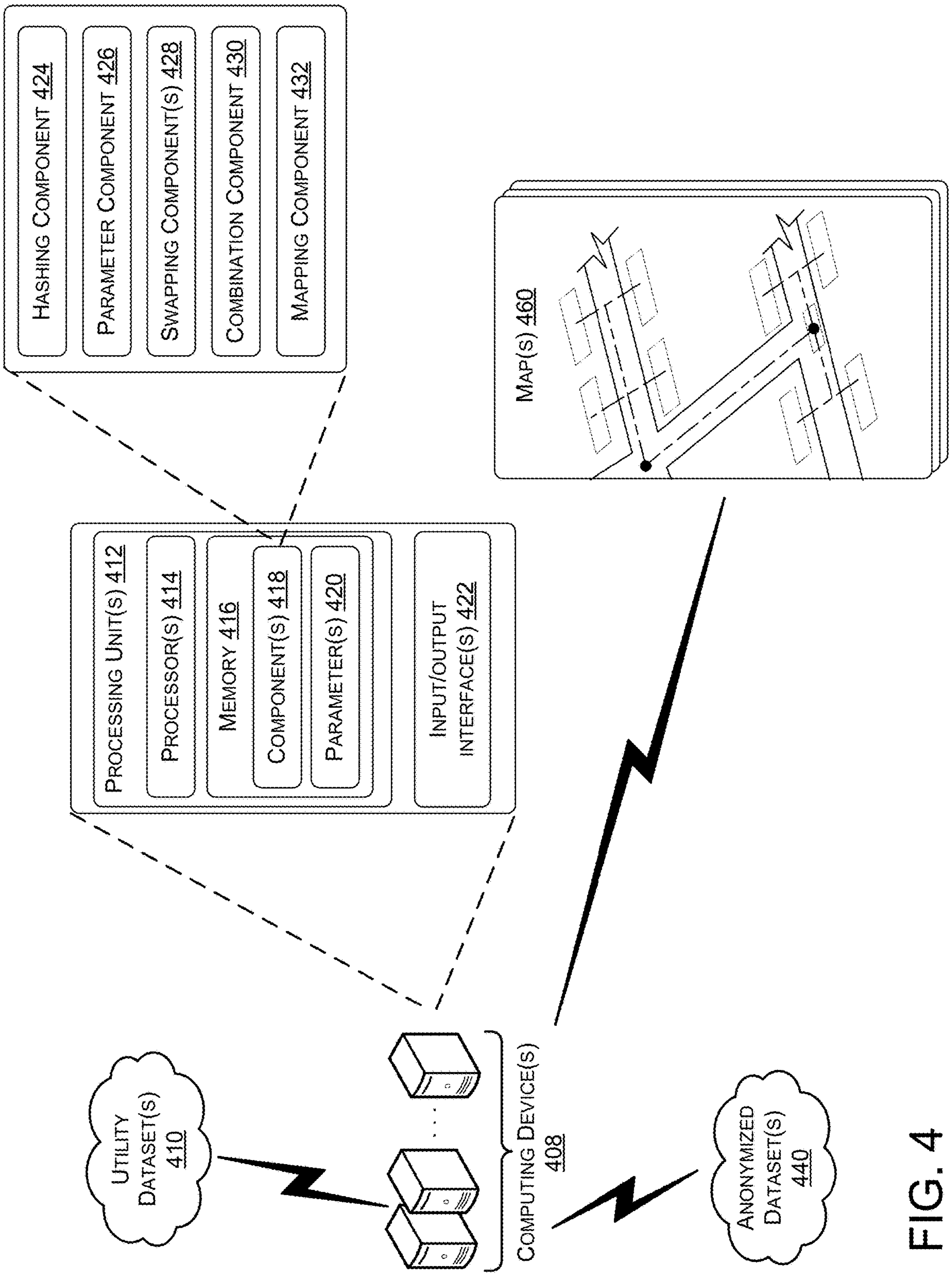
FIG. 4 is a schematic block diagram of an exemplary system including input dataset(s), output anonymized dataset(s), and computing device(s) including components usable to implement the anonymization techniques described herein, in accordance with examples from the disclosure.

FIG. 4 is a schematic view of computing device(s) configured to execute exemplary anonymization techniques. The computing device(s) 408 may receive utility dataset(s) 410 and may output anonymized dataset(s) 440 and/or map(s) 460. The computing device(s) may include processing unit(s) 412. Processing unit(s) 412 may include processor(s) 414 and memory 416. Memory 416 may include one or multiple components 418, and may include one or multiple parameters 420. By way of example, parameter(s) 420 may include user input, demographic information, secret key(s), etc.

The component(s) 418 may include, by way of example and not limitation, a hashing component 424 which may perform a one-way hash operation similar to that shown in FIG. 1, a parameter component 426 which may process or translate parameter(s) 420 or parameters extracted from the utility dataset(s) 410, one or multiple swapping components 428 which may perform one or more of the operations shown in FIGS. 2A-C, a combination component 430 which may combine datasets as shown in FIG. 3, and/or a mapping component 432 which may create map(s) 460. The map(s) 460 may be configured for visual and/or other forms of display or presentation. The component(s) 418 may be or may include non-transitory computer readable media, as in this example. However, component(s) 418 may, in other examples, be specific computing device(s) 408, specific processing unit(s) 412, or specific processor(s) 414. In other examples, component(s) 418 and/or computing device(s) 408 may be specifically printed chips optimized to perform the techniques disclosed herein, or logic circuits which perform the techniques herein based on instructions that may be encoded in software, hardware, or a combination of the two.

Processing unit(s) 412 may also include input/output interface(s) 422 which may be used to input utility dataset(s) 410, parameter(s) 420, memory 416, or other information. Input/output interface(s) 422 may also be used to output anonymized dataset(s) 440, map(s) 460, or other information. Input/output interface(s) 422 may also facilitate input/output between multiple computing device(s) 408, processing unit(s) 412, or component(s) 418. Input/output interface(s) 422 may receive or dispense information via network or direct memory.

Figure 5:
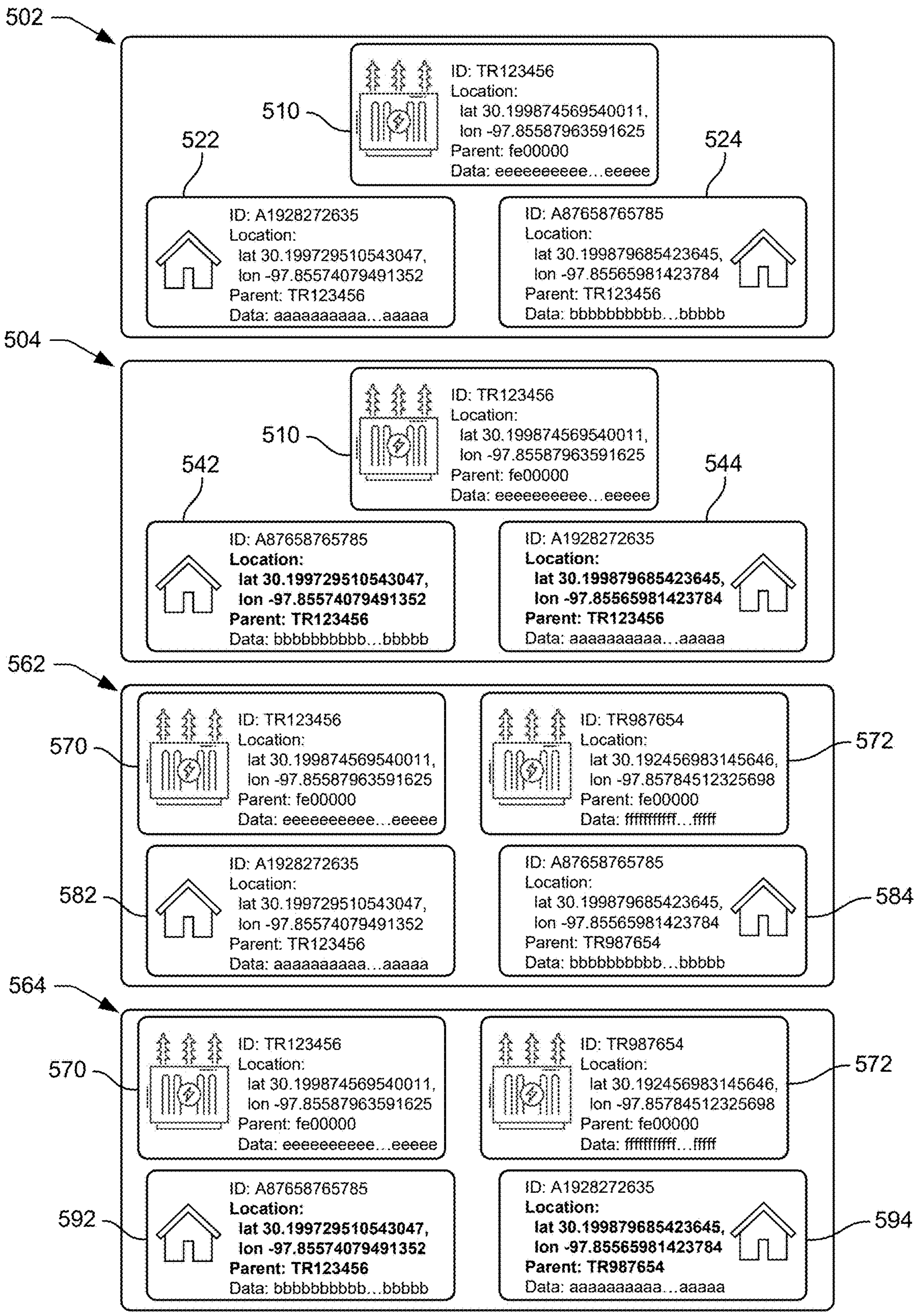
FIG. 5 is a schematic diagram illustrating datasets at various stages of anonymization in accordance with examples from the disclosure.

FIG. 5 is a schematic view of the operations similar to those also illustrated in FIGS. 2A and 2B. Exemplary dataset 502 includes nodes 510, 522, and 524. Each node has information separated into ID, Location, Parent, and Data. For nodes 522 and 524, their parent information indicates the ID information of node 510. This indicates topology. Dataset 504 has undergone an operation similar to that illustrated by FIG. 2A. The updated nodes 542 and 544 have a different combination of ID+Data and Location+Parent associations, though ID and Data have remained together and Location and Parent have remained together. Location and Parent have been bolded to show the difference. However, node 510 has remained the same. This may be considered swapping ID and Data, so, for example, node 522 becomes updated node 542 while maintaining its Parent and Location information. Alternatively, it may be considered swapping the Location and Parent information (in bold), so node 522 becomes updated node 544.

Dataset 562 is a dataset which has undergone operations similar to those in FIG. 1 and FIG. 2A/those which transform dataset 502 to 504. Similar to dataset 502, dataset 562 has nodes which include ID, Location, Parent, and Data information. Node 582 has the ID of node 570 as its Parent, and node 584 has the ID of node 572. Similar to dataset 502, this indicates topology. Updated dataset 564 is the result of operations similar to those shown in FIG. 2B. Updated nodes 592 and 594 maintain their associations of the bolded Location and Parent information, while the ID and Data information has been swapped. Just as for dataset 504, this may be considered a swap of Location and Parent instead.

FIGS. 1-5 illustrate example processes in accordance with examples of the disclosure. These processes are illustrated as logical flow graphs, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

The methods described herein represent sequences of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes. In some embodiments, one or more operations of the method may be omitted entirely. Moreover, the methods described herein can be combined in whole or in part with each other or with other methods.

The various techniques described herein may be implemented in the context of computer-executable instructions or software, such as program modules, that are stored in computer-readable storage and executed by the processor(s) of one or more computing devices such as those illustrated in the figures. Generally, program modules include routines, programs, objects, components, data structures, etc., and define operating logic for performing particular tasks or implement particular abstract data types.

Other architectures may be used to implement the described functionality and are intended to be within the scope of this disclosure. Furthermore, although specific distributions of responsibilities are defined above for purposes of discussion, the various functions and responsibilities might be distributed and divided in different ways, depending on circumstances.

Similarly, software may be stored and distributed in various ways and using different means, and the particular software storage and execution configurations described above may be varied in many different ways. Thus, software implementing the techniques described above may be distributed on various types of computer-readable media, not limited to the forms of memory that are specifically described.

EXAMPLE CLAUSES

A: A system comprising: one or more processors; and non-transitory computer readable media storing computer readable instructions that, when executed, cause the one or more processors to perform operations comprising: receiving a first dataset comprising utility data associated with a collection of nodes, wherein a first portion of the utility data includes original identifiers associated with individual nodes of the collection of nodes that comprise personal identifiable information; encrypting the first dataset by replacing the original identifiers with anonymous identifiers associated with the individual nodes of the collection of nodes; processing the encrypted first dataset into a second dataset by modifying a first portion of information associated with at least some of the nodes in the collection of nodes while maintaining a second portion of information associated with the collection of nodes; and outputting the second dataset.

B: The system of paragraph A, wherein modifying the first portion of information comprises swapping a first anonymous identifier and first service information associated with a first individual node of the collection of nodes to a second anonymous identifier and second service information associated with a second individual node of the collection of nodes; and wherein the second portion of information is associated with a topology.

C: The system of paragraph B, wherein the nodes comprise endpoints and parent nodes, the first and second anonymous identifiers are first and second initial anonymous identifiers, and the first and second service information are first and second initial service information; and the swapping further comprises taking individual endpoints associated with one parent node and changing the first portion of information associated with individual endpoints to a swapped first portion of information, wherein the swapped first portion of information is the second initial anonymous identifier and second initial service information associated with another individual endpoint associated with the one parent node.

D: The system of paragraph C, wherein the swapping further comprises changing first initial anonymous identifiers and first initial service information associated with first individual endpoints to second initial anonymous identifiers and second initial service information associated with second endpoints, wherein the first individual endpoints are associated with a first parent node, and the second initial anonymous identifiers and second initial service information are associated with a different second parent node; and wherein the swapping is based at least in part on the second parent node having substantially similar data to the first parent node.

E: The system of paragraph C, wherein the swapping further comprises changing the first anonymous identifier and first service information associated with a first endpoint of the collection of nodes to a second initial anonymous identifier and second service initial information of a second individual endpoint having substantially similar service information, wherein the second individual endpoint is associated with a different parent node than the endpoints in the collection of endpoints.

F: The system of paragraph A, wherein the collection of nodes is a first collection of nodes and the operations further comprise: receiving a third dataset comprising additional utility data which was not included in the first dataset, wherein the additional utility data is associated with a second collection of nodes, and the additional utility data comprises original identifiers associated with individual nodes of the second collection of nodes; encrypting the third dataset by replacing the original identifiers with anonymous identifiers associated with the individual nodes of the second collection of nodes, wherein the encryption of the third dataset is based at least in part on the encryption applied to the first dataset; processing the encrypted third dataset into a fourth dataset by modifying corresponding information associated with at least some of the additional nodes; and combining the second dataset and the fourth dataset.

G: The system of paragraph F, wherein at least one individual node of the first dataset corresponds to a first service location, and at least one individual node of the third dataset also corresponds to the first service location.

H: The system of paragraph F, wherein at least one node of the third dataset corresponds to a first service location, and no nodes of the first dataset correspond to the first service location.

I: The system of paragraph A, wherein the processing of the encrypted first dataset into the second dataset comprises a mix-and-match methodology based at least in part on at least one of: a measurement of the collection of nodes, wherein the measurement of the collection of nodes is associated with: the collection of nodes further comprising endpoints and parent nodes, and a value associated with a number of endpoints associated with a number of parent nodes; topology associated with the first dataset; demographic information associated with the first dataset; utility consumption information associated with the collection of nodes; or geographical information associated with the first dataset.

J: The system of paragraph A, wherein the anonymous identifiers are determined by a one-way hashing algorithm with deterministic outputs based at least in part on a secure key.

K: The system of paragraph A, the operations further comprising displaying the second dataset on a map.

L: A method comprising: assigning anonymous identifiers to endpoints of a first dataset comprising utility data associated with at least one endpoint, the at least one endpoint associated with at least one parent node; based at least in part on a feature associated with the utility data, processing the first dataset to swap data associated with the endpoints with data associated with other endpoints; and outputting a processed first dataset.

M: The method of paragraph L, wherein the assigning of anonymous identifiers is performed by a one-way hashing algorithm.

N: The method of paragraph L, wherein a methodology for swapping the data is selected based at least in part on a topology associated with the first dataset and substantially maintains a topology associated with the first dataset.

O: The method of paragraph L, further comprising: receiving a second dataset similarly comprising utility data associated with endpoints and parent nodes; assigning anonymous identifiers to the endpoints of the second dataset; processing the first dataset and the second dataset to: combine the first dataset and the second dataset, and swap data associated with individual endpoints with data associated with other endpoints; and outputting a combined third dataset.

P: The method of paragraph O, wherein the swapping of the data associated with the endpoints of the combined first and second datasets comprises swapping a first anonymous identifier and service information associated with a first individual endpoint of the first dataset with a second anonymous identifier and service information associated with a second individual endpoint of the second dataset.

Q: The method of paragraph L, wherein the swapping comprises at least one of: swapping a first anonymous identifier and first service information associated with a first individual endpoint with a second anonymous identifier of a second individual endpoint associated with a same parent node as the first individual endpoint; swapping first anonymous identifiers and first service information associated with first individual endpoints with second anonymous identifiers associated with second individual endpoints, wherein the second individual endpoints are associated with a different, second parent node; or swapping anonymous identifier and service information associated with a first endpoint with a second endpoint having substantially similar utility data, wherein the second endpoint is associated with a different parent node from the first endpoint.

R: One or more non-transitory computer-readable media storing computer-executable instructions that, when executed, cause one or more processors to perform operations comprising: using a deterministic one-way hashing algorithm to assign anonymous identifiers to endpoints of a dataset comprising utility data associated with at least one endpoint, the at least one endpoint associated with at least one parent node; processing the dataset to swap data associated with the endpoints with data associated with other endpoints; and outputting the processed dataset.

S: The one or more non-transitory computer-readable media of paragraph R, wherein, based at least in part on a swapping parameter, the swapping for each endpoint is at least one of: swapping a first anonymous identifier and first service information associated with a first individual endpoint with a second anonymous identifier of a second individual endpoint associated with a same parent node as the first individual endpoint; swapping first anonymous identifiers and first service information associated with first individual endpoints with second anonymous identifiers associated with second individual endpoints, wherein the second individual endpoints are associated with a different, second parent node; or swapping anonymous identifier and service information associated with a first endpoint with a second endpoint having substantially similar utility data, wherein the second endpoint is associated with a different parent node from the first endpoint.

T: The one or more non-transitory computer-readable media of paragraph R, wherein the dataset is a first dataset and the operations further comprising: receiving a second dataset similarly comprising utility data associated with endpoints and parent nodes; assigning anonymous identifiers to the endpoints of the second dataset using a same deterministic one-way hashing algorithm; processing the first and second datasets to: combine the first and second datasets, and swap data associated with individual endpoints with data associated with other individual endpoints; and outputting a combined third dataset.

U: The system of paragraph A, wherein modifying the first portion of information comprises swapping a first location coordinate and first parent node identifier associated with a first individual node of the collection of nodes to a second location coordinate and second parent node identifier associated with a second individual node of the collection of nodes.

V: The system of paragraph B, wherein the nodes comprise endpoints and parent nodes, the first and second anonymous identifiers are first and second initial anonymous identifiers, and the first and second service information are first and second initial service information; and the swapping further comprises changing first initial anonymous identifiers and first initial service information associated with first individual endpoints to second initial anonymous identifiers and second initial service information associated with second endpoints, wherein the first individual endpoints are associated with a first parent node, and the second initial anonymous identifiers and second initial service information are associated with a different second parent node; and wherein the swapping is based at least in part on the second parent node having substantially similar data to the first parent node.

W: The system of paragraph B, wherein the nodes comprise endpoints and parent nodes, the first and second anonymous identifiers are first and second initial anonymous identifiers, and the first and second service information are first and second initial service information; and the swapping further comprises changing the first anonymous identifier and first service information associated with a first endpoint of the collection of nodes to a second initial anonymous identifier and second service initial information of a second individual endpoint having substantially similar service information, wherein the second individual endpoint is associated with a different parent node than the endpoints in the collection of endpoints.

While the example clauses described above are described with respect to one particular implementation, it should be understood that, in the context of this document, the content of the example clauses can also be implemented via a method, device, system, computer-readable medium, and/or another implementation. Additionally, any of examples A-W may be implemented alone or in combination with any other one or more of the examples A-W.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described. For example, swapping of information may occur before any stripping and assignment of anonymous identifiers. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. A system comprising:

one or more processors; and non-transitory computer readable media storing computer readable instructions that, when executed, cause the one or more processors to perform operations comprising:

receiving a first dataset comprising utility data associated with a collection of nodes, wherein a first portion of the utility data includes original identifiers associated with individual nodes of the collection of nodes that comprise personal identifiable information;

encrypting the first dataset by replacing the original identifiers with anonymous identifiers associated with the individual nodes of the collection of nodes;

processing the encrypted first dataset into a second dataset by modifying a first portion of information associated with at least some of the nodes in the collection of nodes while maintaining a second portion of information associated with the collection of nodes; and outputting the second dataset.

2. The system of claim 1, wherein modifying the first portion of information comprises swapping a first anonymous identifier and first service information associated with a first individual node of the collection of nodes to a second anonymous identifier and second service information associated with a second individual node of the collection of nodes; and wherein the second portion of information is associated with a topology.

3. The system of claim 2, wherein the nodes comprise endpoints and parent nodes, the first and second anonymous identifiers are first and second initial anonymous identifiers, and the first and second service information are first and second initial service information; and the swapping further comprises taking individual endpoints associated with one parent node and changing the first portion of information associated with individual endpoints to a swapped first portion of information, wherein the swapped first portion of information is the second initial anonymous identifier and second initial service information associated with another individual endpoint associated with the one parent node.

4. The system of claim 3, wherein the swapping further comprises changing first initial anonymous identifiers and first initial service information associated with first individual endpoints to second initial anonymous identifiers and second initial service information associated with second endpoints, wherein:

the first individual endpoints are associated with a first parent node, and the second initial anonymous identifiers and second initial service information are associated with a different second parent node; and wherein the swapping is based at least in part on the second parent node having substantially similar data to the first parent node.

5. The system of claim 3, wherein the swapping further comprises changing the first anonymous identifier and first service information associated with a first endpoint of the collection of nodes to a second initial anonymous identifier and second initial service information of a second individual endpoint having substantially similar service information, wherein the second individual endpoint is associated with a different parent node than the endpoints in the collection of nodes.

6. The system of claim 1, wherein the collection of nodes is a first collection of nodes and the operations further comprise:

receiving a third dataset comprising additional utility data which was not included in the first dataset, wherein the additional utility data is associated with a second collection of nodes, and the additional utility data comprises original identifiers associated with individual nodes of the second collection of nodes;

encrypting the third dataset by replacing the original identifiers with anonymous identifiers associated with the individual nodes of the second collection of nodes, wherein the encryption of the third dataset is based at least in part on the encryption applied to the first dataset;

processing the encrypted third dataset into a fourth dataset by modifying corresponding information associated with at least some of the additional nodes; and combining the second dataset and the fourth dataset.

7. The system of claim 6, wherein at least one individual node of the first dataset corresponds to a first service location, and at least one individual node of the third dataset also corresponds to the first service location.

8. The system of claim 6, wherein at least one node of the third dataset corresponds to a first service location, and no nodes of the first dataset correspond to the first service location.

9. The system of claim 1, wherein the processing of the encrypted first dataset into the second dataset comprises a mix-and-match methodology based at least in part on at least one of:

a measurement of the collection of nodes, wherein the measurement of the collection of nodes is associated with:

the collection of nodes further comprising endpoints and parent nodes, and a value associated with a number of endpoints associated with a number of parent nodes;

a topology associated with the first dataset;

demographic information associated with the first dataset;

utility consumption information associated with the collection of nodes; or geographical information associated with the first dataset.

10. The system of claim 1, wherein the anonymous identifiers are determined by a one-way hashing algorithm with deterministic outputs based at least in part on a secure key.

11. The system of claim 1, the operations further comprising displaying the second dataset on a map.

12. A method comprising:

encrypting a first dataset comprising utility data associated with at least one endpoint by assigning anonymous identifiers to endpoints of the first dataset, the at least one endpoint associated with at least one parent node;

based at least in part on a feature associated with the utility data, processing the encrypted first dataset to swap data associated with the endpoints with data associated with other endpoints; and outputting a processed first dataset.

13. The method of claim 12, wherein the assigning of anonymous identifiers is performed by a one-way hashing algorithm.

14. The method of claim 12, wherein a methodology for swapping the data is selected based at least in part on a topology associated with the first dataset and substantially maintains a topology associated with the first dataset.

15. The method of claim 12, further comprising:

receiving a second dataset similarly comprising utility data associated with endpoints and parent nodes;

assigning anonymous identifiers to the endpoints of the second dataset;

processing the first dataset and the second dataset to:

combine the first dataset and the second dataset, and swap data associated with individual endpoints with data associated with other endpoints; and outputting a combined third dataset.

16. The method of claim 15, wherein the swapping of the data associated with the endpoints of the combined first and second datasets comprises swapping a first anonymous identifier and service information associated with a first individual endpoint of the first dataset with a second anonymous identifier and service information associated with a second individual endpoint of the second dataset.

17. The method of claim 12, wherein the swapping comprises at least one of:

swapping a first anonymous identifier and first service information associated with a first individual endpoint with a second anonymous identifier of a second individual endpoint associated with a same parent node as the first individual endpoint;

swapping first anonymous identifiers and first service information associated with first individual endpoints with second anonymous identifiers associated with second individual endpoints, wherein the second individual endpoints are associated with a different, second parent node; or swapping anonymous identifier and service information associated with a first endpoint with a second endpoint having substantially similar utility data, wherein the second endpoint is associated with a different parent node from the first endpoint.

18. One or more non-transitory computer-readable media storing computer-executable instructions that, when executed, cause one or more processors to perform operations comprising:

using a deterministic one-way hashing algorithm to assign anonymous identifiers to endpoints of a dataset comprising utility data associated with at least one endpoint, the at least one endpoint associated with at least one parent node;

processing the dataset to swap data associated with the endpoints with data associated with other endpoints; and outputting the processed dataset.

19. The one or more non-transitory computer-readable media of claim 18, wherein, based at least in part on a swapping parameter, the swapping for each endpoint is at least one of:

swapping a first anonymous identifier and first service information associated with a first individual endpoint with a second anonymous identifier of a second individual endpoint associated with a same parent node as the first individual endpoint;

swapping first anonymous identifiers and first service information associated with first individual endpoints with second anonymous identifiers associated with second individual endpoints, wherein the second individual endpoints are associated with a different, second parent node; or swapping anonymous identifier and service information associated with a first endpoint with a second endpoint having substantially similar utility data, wherein the second endpoint is associated with a different parent node from the first endpoint.

20. The one or more non-transitory computer-readable media of claim 18, wherein the dataset is a first dataset and the operations further comprising:

receiving a second dataset similarly comprising utility data associated with endpoints and parent nodes;

assigning anonymous identifiers to the endpoints of the second dataset using a same deterministic one-way hashing algorithm;

processing the first and second datasets to:

combine the first and second datasets, and swap data associated with individual endpoints with data associated with other individual endpoints; and outputting a combined third dataset.

* * * * *